United States Patent [19]

Imai

[11] Patent Number: 4,751,952

[45] Date of Patent: Jun. 21, 1988

[54] PNEUMATIC TIRE

[75] Inventor: Isamu Imai, Tokorozawa, Japan

[73] Assignee: Bridgestone Corporation, Tokyo, Japan

[21] Appl. No.: 849,335

[22] Filed: Apr. 8, 1986

[30] Foreign Application Priority Data

Apr. 8, 1985 [JP] Japan ................................ 60-73837

[51] Int. Cl.$^4$ ..................... B60C 9/18; B60C 9/06; B60C 9/08
[52] U.S. Cl. ..................................... 152/527; 57/251; 57/902; 152/537; 152/556; 152/559; 152/560; 152/564; 528/335
[58] Field of Search .................. 528/335; 57/243, 902, 57/251, 250; 152/451, 527, 556, 526, 537, 558, 559, 560, 564; 156/123, 130; 428/295

[56] References Cited

U.S. PATENT DOCUMENTS

| | | | |
|---|---|---|---|
| 4,047,552 | 9/1977 | Maeda et al. ...................... | 152/527 |
| 4,240,486 | 12/1980 | Schmit et al. .................... | 152/527 X |
| 4,408,036 | 10/1983 | Gaymans et al. ................... | 528/335 |
| 4,446,304 | 5/1984 | Gaymans et al. ................... | 528/335 |
| 4,460,762 | 7/1984 | Gaymans et al. ................... | 528/335 |

Primary Examiner—Michael Ball
Assistant Examiner—Thomas Bokan
Attorney, Agent, or Firm—Sughrue, Mion, Zinn, Macpeak and Seas

[57] ABSTRACT

A pneumatic tire comprises an annular tread at a central portion, a pair of side wall portions, bead portions, a carcass extending between both bead wires, and a breaker composed of two or more cord layers with cords arranged at a cord angle of 5-60° relative to the circumferential direction and between the tread and the carcass and intersecting in the adjacent plies. The cords constituting the carcass or the breaker are substantially made of polytetramethylene adipamide (4,6-nylon), and as buried in a rubber of the tire, have the following characteristics:

$$5.0(\%) \leq E_2 \leq 9.0(\%)$$

$$E_2 + \Delta S \leq 13.0(\%)$$

where $E_2$ is an elongation (%) at 2.0 g/d, and $\Delta S$ is a heat shrinkability (%) when measured in the state that the cords are left at 177° C. under application of load of 20 g/cord for 30 minutes and kept as it is. The burying rubber has the following characteristics:

$$20 \text{ kg/cm}^2 \leq M_{100(\%)} \leq 60 \text{ kg/cm}^2$$

where $M_{100}\%$ is a stress at 100% elongation of the rubber.

1 Claim, No Drawings

PNEUMATIC TIRE

BACKGROUND OF THE INVENTION

1. Field of the Invention

The present invention relates to a pneumatic tire with excellent properties which have not been attained in the conventional tires, wherein 4,6-nylon is used in carcass cords in the case of pneumatic radial tires in which cords of belt layer may be steel, aramide, PET (polyester) or composite thereof or in breaker or carcass cords in the case of pneumatic bias tires.

2. Related Art Statement

As the material for the carcass cords in the conventional radial tires, use have been made of steel, aramide, nylon, PET, rayon and so on. In the tires having a relatively high internal pressure with a heavy load, steel, aramide, and PET are used. Meanwhile, nylon, PET, rayon and the like are used in the passenger car ties having a relatively low internal pressure. This reason is that it is preferable that under the high internal pressure and heavy load, the elongation of the material of the carcass cords is made small (modulus being high) and the strain of the belt edges or the carcass edges of the radial tires is made as small as possible, and that the modulus is rather lower in the case of the passenger car tires because the riding comfortably is made much of. However, the material of the carcass cords suitably used in the medium range has been recently desired in that the internal pressure is made higher to lower the rolling resistance and the radial tires have become popularized for the light trucks. Although PET and nylon are ordinarily used as general purpose materials in this range, PET undergoes hydrolysis with amine component in the rubber, and therefore countermeasure is required to make heat generation of the tire as small as possible. On the other hand, nylon has a small modulus and a large elongation under application of the internal pressure and load. Thus, nylon remains unsatisfactory for the durability.

Next, with respect to the required characteristics as the cord material of the carcass in the bias tires, the cord material having excellent flex fatigue performance relative to the repeated strain of the tire is preferentially used, and the nylon is now mainly used. However, to the contrary, there have been strongly demanded improvement on the cornering stability and reduction in noise level as the required performances of the recent bias tires, which are coped with by replacing the nylon by PET. However, as to PET, there is a deterioration problem due to hydrolysis in the rubber as mentioned above, and it is an actual situation that PET can be used only up to tires having a small heat generating property.

SUMMARY OF THE INVENTION

It is an object of the present invention to provide a pneumatic tire which satisfies the above required performances by improving the cord material.

The present invention is based on the acknowledgement that with respect to both the radial tires and the bias tires, it is desirable to constitute cord layers by using cords which have deterioration characteristics and fatigue characteristics similar to those of nylon and the modulus similar to that of PET as the material of the carcass cords.

The invention has been accomplished on the basis that having noted and investigated 4,6-nylon as the cord material of the carcass cords of the radial tires and cords material of carcass or breaker cords of bias tires, the inventors have found that 4,6-nylon exhibits excellent characteristics depending upon the using way.

According to the present invention, there is a provision of a pneumatic tire provided with an annular tread at a central portion, a pair of side wall portions connected to the opposite side edges of the tread, respectively, bead portions containing bead wires, a carcass extending between both the bead wires and bent surrounding the bead wires while the tip ends being fixed, and a breaker composed of two or more cord layers in which cords are arranged at a cord angle of 5°–60° with respect to the circumferential direction and between the tread and the carcass and intersect in the adjacent plies, wherein the cords constituting the carcass or the breaker are substantially made of polytetramethylene adipamide (4,6-nylon), the cords as buried in a rubber of the tire have the following characteristics:

$$5.0 \, (\%) \leq E_2 \leq 9.0 \, (\%)$$

$$E_2 + \Delta S \leq 13.0 \, (\%)$$

in which $E_2$ is an elongation (%) at 2.0 g/d, and $\Delta S$ is a heat shrinkability (%) when measured in the state that the cords are left at 177° C. under application of load of 20 g/cord for 30 minutes and kept as it is, and the burying rubber has the following characteristics:

$$20 \, kg/cm^2 \leq M_{100(\%)} \leq 60 \, kg/cm^2$$

in which $M_{100\%}$ is a stress at 100% elongation of the rubber.

These and other objects, features, and advantages of the present invention will be well appreciated upon reading of the following description of the invention with understanding that some modifications, variations and changes could be easily done by the skilled in the art to which the invention pertains without departing from the spirit of the invention or the scope of claims appended hereto.

DETAILED DESCRIPTION OF THE INVENTION

The present invention will be described more in detail in the following.

With respect to the cord characteristics, it is suggested that 4,6-nylon has a smaller heat shrinkability as compared with 6,6-nylon and 6-nylon and substantially the same level of deterioration in rubber as 6,6-nylon or 6-nylon (Japanese Patent Application Laid-open Nos. 59-88,911, 59-88,910, 59-87,140, and 59,76,914). However, the importance is that the performances of the tire are determined by the characteristics of the cords burried in the tire. There has not been an example in which 4,6-nylon is used utilizing a high modulus as the cords of the tire. Further, even if the modulus is controlled in any way through varying the heat treating conditions, the modulus of the cords in the tire can not be controlled. Thus, the tension and temperature applied to the cords during the vulcanization step are important factors. As a matter of source, it is actually necessary to have the desired modulus exhibited by controlling the vulcanization temperatures and the pressure of post curing-inflation (PCI) to meet the respective tires. In addition, if the burying rubber has a low modulus, rigidity as the carcass cord layer becomes insufficient, while if the modulus of the burying ubber has a high modulus, the flex fatigue performance is lowered. Therefore, it is necessary to balance them.

If the above $E_2$ among the characteristics of the tire rubber-buried cords of the carcass or breaker in the tire according to the present invention is larger than 9.0, the same level performance as in the existing pneumatic tire having the nylon carcass cords can be merely obtained. If it is less than 5.0%, other characteristics of the cords, particularly, the heat shrinkage becomes larger, so that it becomes extremely difficult to build tires of a uniform dimension during the production of tires. Here, $E_2$ is a measure of modulus, and $\Delta S$ is a magnitude of the heat shrinkage, thus $E_2 + \Delta S$ being a measure for retainment of the modulus in the tire. That is, the smaller the $E_2$ is, the better is the tire, but the $\Delta S$ becomes larger by the lowered amount of $E_2$. Accordingly, the cords are shrinked by heat applied during the production of the tire or during running of the tire, so that the $E_2$ varies toward an increasing direction. Therefore, it is desirably that the $E_2 + \Delta S$ is smaller, and particularly not more than 13.0 (%).

Further, the $M_{100\%}$ of the burying rubber is 20 to 60 kg/cm$^2$. If it is less than 20 kg/cm$^2$, the rigidity of the cord composite as the carcass material becomes too small, so that the deformation strain at the time of a load being applied to the tire becomes larger to lower the durability. If it is larger than 60 kg/cm$^2$, the rigidity of the cord composite becomes improved, but the imput ratio relative to the cords at the time of the deformation becomes larger to largely lower the fatigue characteristics of the cords.

The present invention will be concretely explained more in detail with reference to the following Examples, which are merely given to illustrate the invention but never interpreted to limit the scope thereof.

present invention which do not depend upon the $E_2$ after the heat treatment (dipping) and have $E_2$ of the cords in the tire being set at not more than 9.0% through the post curing-inflation conditions. Tire No. 5 is a comparative tire in which the $E_2$ of the cords in the tire is set at not less than 9.0%. Tires Nos. 6 and 7 are comparative tires with $M_{100\%}$ of the burying rubber being less than 20 kg/cm$^2$ and more than 60 kg/cm$^2$, respectively.

With respect to these tires tests on the cord fatigue properties and durability were carried out according to the following evaluation ways, and results obtained are shown in Table 1.

1. Tire durability test (1):

A tire begun to run on a drum of 2 m in diameter at a speed of 60 km/hr under a standard load and internal pressure, and continued to run until the tire was broken while the load was increased by 20% per 8 hours.

2. Tire durability test (2):

A tire continued to run on a drum of 2 m in diameter under a load of two times as heavy as the standard load and an internal pressure until the tire was broken. The speed was set at 60 km/hr and a tread portion of the tire was buffed to lessen the heat generation and cause a disorder at a bead portion.

3. Tire durability test (3):

A tire was continuously run on the above drum under a load of 1.2 times as heavy as the standard load and the standard internal pressure until 100,000 km running. Disorders were judged when the tire was broken on the way, and when the tire completed the running, the residual strength of the cord was measured, and the fatigue characteristics of the tire was judged based on the hold rate from the fresh tire.

TABLE 1

|  |  | 1 Comparative Example | 2 Comparative Example | 3 Example | 4 Example | 5 Comparative Example | 6 Comparative Example | 7 Comparative Example |
|---|---|---|---|---|---|---|---|---|
| Cord material Properties after dipping | Carcass (denier) | PET (1,500/2) | 6,6-nylon (1,260/2) | 4,6-nylon (1,260/2) | 4,6-nylon (1,260/2) | 4,6-nylon (1,260/2) | 4,6-nylon (1,260/2) | 4,6-nylon (1,260/2) |
|  | Strength (kg) | 22.0 | 22.5 | 21.5 | 20.7 | 21.5 | 21.5 | 21.5 |
|  | $E_2$ (%) | 5.0 | 7.0 | 7.0 | 9.5 | 7.0 | 7.0 | 7.0 |
|  | Elongation at break (%) | 18.0 | 20.0 | 19.0 | 20.5 | 19.0 | 19.0 | 19.0 |
| PCI conditions | Temperature (°C.) |  |  |  |  |  |  |  |
|  | (1) | 170 | 170 | 170 | 170 | 170 | 170 | 170 |
|  | (2) | 100 | 90 | 80 | 80 | 80 | 80 | 80 |
|  | PCI internal pressure (kg/cm$^2$) | 4.0 | 4.0 | 4.0 | 6.5 | 2.0 | 4.0 | 4.0 |
| Properties of cords in tire | Strength (kg) | 22.0 | 22.5 | 21.5 | 21.5 | 21.0 | 21.5 | 21.5 |
|  | $E_2$ (%) | 5.5 | 9.5 | 6.7 | 6.9 | 9.2 | 6.7 | 6.7 |
|  | Elongation at break (%) | 18.5 | 22.0 | 18.1 | 18.3 | 20.4 | 18.1 | 18.1 |
|  | $\Delta S$ (%) | 4.5 | 6.0 | 5.6 | 5.5 | 4.5 | 5.6 | 5.6 |
|  | $E_2 + \Delta S$ (%) | 10.3 | 15.5 | 12.3 | 12.4 | 13.7 | 12.3 | 12.3 |
| Rubber | $M_{100\%}$ (kg/cm$^2$) | 25 | 25 | 25 | 25 | 25 | 15 | 70 |
| Tire properties | Durability test |  |  |  |  |  |  |  |
|  | (1) | 200 | 140 | 180 | 180 | 140 | 100 | 180 |
|  | (2)(km) | 20,000 | 17,000 | 20,000 | 20,000 | 14,000 | 12,000 | 20,000 |
|  | (3)(km) | 100,000 | 80,000 | 100,000 | 100,000 | 90,000 | 55,000 | 60,000 |
|  | Cord fatigue property (%) | 60 | 60 | 90 | 90 | 92 | 90 | 60 |

EXAMPLE 1

Seven kinds of radial tires of a tire size of 700 R 15 each reinforced with two carcass cord layers using cords made of a material shown in Table 1 where prepared in trial. Tires Nos. 1 and 2 are comparative tires using PET and 6,6-nylon as the cord material, respectively. Tire Nos. 3 and 4 are Examples according to the

EXAMPLE 2

Eight kinds of bias tires each having a tire size of 700-15 employing four carcass cord layers and two breaker cord layers using cords made from a material shown in Table 2 (cord material: 6,6-nylon, 840 d/2) were prepared in trial. With respect to these tires, tests on the cornering stability (CP), wear resistance, noise performance [db(A)], F.S. resistance, and durability were evaluated, and results are shown in Table 2.

a. Cornering stability test:

Slip angles were given to a tire 1° by 1° with respect to a circumferential direction while the tire was pushed against a drum of 3 m in diameter at a speed of 30 km/hr under a standard load and internal pressure, and axial forces of the tire at that time were measured. A value obtained by dividing a force at the time of 3° by 3 was taken as C.P. (cornering power) value.

b. Noise test:

A tire was run on a rough surface drum of 3 m in diameter at a speed of 50 km/hr under standard load and internal pressure in a soundless chamber, and a sound pressure level was measured near a tread face by means of a microphone, and displayed by dB(A). Taking an evaluated value of Tire No. 3 as 100, the wear resistance was indicated by index. The F.S. resistance (Flat-spot resistance) was evaluated through feeling.

Durability test (A) was carried out under the same conditions as in tire durability test (1) of Example 1, and a speed was raised by 10 km/hr per 30 minutes starting from a speed of 60 km/hr. A speed causing a trouble was recorded.

In durability test (B), a tire was run on a drum of 2 m in diameter at a constant speed of 60 km/hr under the standard internal pressure and application of a load of 1.5 times as heavy as the standard load.

particularly, the durability in the case of the radial tires and further the cornering stability and the noise performance in the case of the bias tire are remarkably improved.

What is claimed is:

1. A pneumatic tire comprising an annular tread at a central portion, a pair of side wall portions connected to the opposite side edges of the tread, respectively, bead portions containing bead wires, a carcass extending between both the bead wires and bent surrounding the bead wires while the tip ends are fixed, and a breaker composed of two or more cord layers in which cords are arranged at a cord angle of 5°–60° with respect to the circumferential direction and between the tread and the carcass and intersect in the adjacent plies, wherein the cords constituting a component of the tire selected from the group consisting of the carcass and the breaker, are substantially made of polytetramethylene adipamide (4,6-nylon), and wherein the cords, as buried in a rubber of the tire, have the following characteristics:

$$5.0 \, (\%) \leq E_2 \leq 9.0 \, (\%)$$

$$E_2 + \Delta S \leq 13.0 \, (\%)$$

in which $E_2$ is an elongation (%) at 2.0 g/d, and $\Delta S$ is a heat shrinkability (%) when measured in the state that the cords are left at 177° C. under application of a load

TABLE 2

| | | 1 Comparative Example | 2 Comparative Example | 3 Comparative Example | 4 Example | 5 Example | 6 Comparative Example | 7 Comparative Example | 8 Comparative Example |
|---|---|---|---|---|---|---|---|---|---|
| Cord material | Carcass (denier) | Rayon (1,650/3) | PET (1,500/2) | 6,6-nylon (1,260/2) | 4,6-nylon (1,260/2) | 4,6-nylon (1,260/2) | 4,6-nylon (1,260/2) | 4,6-nylon (1,260/2) | 4,6-nylon (1,260/2) |
| Properties after dipping | Strength (kg) | 24.0 | 22.0 | 23.0 | 21.0 | 20.7 | 21.0 | 21.0 | 21.0 |
| | $E_2$ (%) | 4.0 | 5.5 | 8.0 | 7.0 | 9.3 | 7.0 | 7.0 | 7.0 |
| | Elongation at break (%) | 17.0 | 18 | 21 | 19.0 | 20.5 | 19.0 | 19.0 | 19.0 |
| | Heat shrinkability (%) | 1.2 | 4.0 | 8.0 | 5.6 | 3.8 | 5.6 | 5.6 | 5.6 |
| PCI conditions | Temperature(°C.) | | | | | | | | |
| | (1) | 170 | 170 | 170 | 170 | 170 | 170 | 170 | 170 |
| | (2) | 100 | 95 | 90 | 80 | 80 | 80 | 110 | 80 |
| | PCI internal pressure (kg/cm²) | 6.0 | 6.0 | 6.0 | 6.0 | 8.0 | 4.0 | 6.0 | 6.0 |
| Properties of cords in tire | Strength (kg) | 24.0 | 22.5 | 23.0 | 20.0 | 20.0 | 20.1 | 20.1 | 20.0 |
| | $E_2$ (%) | 4.5 | 5.3 | 9.5 | 6.7 | 6.8 | 9.2 | 9.5 | 6.7 |
| | Elongation at break (%) | 17.5 | 17.6 | 20.0 | 18.1 | 18.3 | 20.4 | 20.7 | 18.1 |
| | $\Delta S$ (%) | 1.3 | 4.3 | 7.0 | 5.6 | 5.7 | 4.5 | 4.2 | 5.6 |
| | $E_2 + \Delta S$ (%) | 5.8 | 9.6 | 16.5 | 12.3 | 12.5 | 13.7 | 13.7 | 12.3 |
| Rubber | $M_{100\%}$ (kg/cm²) | 23 | 23 | 23 | 35 | 35 | 35 | 15 | 70 |
| Tire properties | Cornering power (CP) | 140 | 135 | 100 | 125 | 124 | 102 | 101 | 120 |
| | Wear resistance (index) | 120 | 120 | 100 | 118 | 117 | 103 | 103 | 115 |
| | Noise property (dB(A)) | 61 | 62 | 65 | 63 | 63 | 65 | 65 | 63 |
| | F.S. resistance | no | no | large | no | no | large-medium | large | no |
| | Durability test | | | | | | | | |
| | (A)(km/hr) | 100 | 110 | 150 | 150 | 150 | 150 | 150 | 120 |
| | (B)(km) | 15,000 (CBU) | 20,000 (burst) | 30,000 (running completed) | 30,000 (running completed) | 30,000 (running completed) | 30,000 (running completed) | 30,000 (running completed) | 22,000 (separation) |

As explained in the above, according to the pneumatic tire of the present invention, the carcass cords or breaker cords are constituted by 4,6-nylon satisfying the conditions of $5.0(\%) \leq E_2 \leq 9.0(\%)$ and $E_2 + \Delta S \leq 13.0(\%)$ in the state of the cords being bured in the rubber of the tire, and the rubber satisfying the condition of $20 \, \text{kg/cm}^2 \leq M_{100\%} \leq 60 \, \text{kg/cm}^2$ is used as the burying rubber. Thus, the various properties of the tire are improved. As evident from Tables 1 and 2, of 20 g/cord maintained for 30 minutes,
and wherein the rubber in which the cords are buried has the following characteristics:

$$20 \, \text{kg/cm}^2 \leq M_{100(\%)} \leq 60 \, \text{kg/cm}^2$$

in which $M_{100\%}$ is a stress at 100% elongation of the rubber.

* * * * *